United States Patent [19]
Berry et al.

[11] Patent Number: 5,523,516
[45] Date of Patent: Jun. 4, 1996

[54] METHOD FOR RECYCLING LITHIUM BATTERIES

[75] Inventors: Stan D. Berry, Carlsbad, Calif.; Frank Bis, Mt. Airy, Md.; Dave T. Edelstein, Fredericksburg, Va.; Arpad E. Torma, Rio Rancho, Calif.

[73] Assignee: National Technical Systems, Inc, Calabasas, Calif.

[21] Appl. No.: 418,775

[22] Filed: Apr. 7, 1995

[51] Int. Cl.⁶ .................................. C06B 21/00
[52] U.S. Cl. .............. 588/202; 110/344; 149/124
[58] Field of Search ............. 588/202; 110/344; 149/124

[56] References Cited

U.S. PATENT DOCUMENTS 3,848,548  11/1974  Bolejack, Jr. et al. ............ 110/7 R
4,340,421   7/1982  Bergsoe .............................. 75/2.5
4,416,855  11/1983  Abrams et al. .................... 422/111
4,637,928   1/1987  Zajac, Jr. et al. ................. 423/659
5,220,107   6/1993  Kubacki ............................. 588/203

*Primary Examiner*—Ngoclan Mai

[57] ABSTRACT

A method for processing electric storage batteries, particularly lithium/thionyl chloride batteries, which includes the steps of discharging the batteries, lowering the temperature of the battery components to −180° C., and cutting the battery into pieces while in its cold state before further processing. The process can also include the further steps of incineration, collecting the solid, liquid and gaseous discharges from the incinerator, washing the solid and liquid discharges with water and the gaseous discharge with an alkaline solution, mixing the resultant wash streams, separating precipitates formed from the mixed stream and neutralizing the remaining solution.

18 Claims, 1 Drawing Sheet

METHOD FOR RECYCLING LITHIUM BATTERIES

BACKGROUND

Lithium batteries have been extensively used as a reliable source of electrical energy. However, at the end of the useful life of these batteries there is a need for the safe dismantling, destruction and disposal or recycling of the components of lithium batteries because of the hazardous nature of the components and the reaction products generated in discharge and destruction of these batteries. With the advent of electrical vehicles and EPA regulations restricting further the emissions allowable from vehicles and disposal sites, it is likely that such high energy batteries, or batteries of different composition with similar disposal problems will be used in greatly increased quantities.

The disposal of lithium batteries can be extremely dangerous because the cell components as well as the products created on discharge of the cells are unstable and the battery destruction process can result in explosive reactions, fires and the release of corrosive and toxic byproducts. Exposure of thionyl chloride to water rapidly creates hydrochloric and sulfuric acid forming a toxic cloud of acid which can include entrained thionyl chloride. Batteries composed of lithium bromide and sulfur dioxide dissolved in acetonitrile produce toxic cyanides upon discharge. Elemental lithium exposed to water can decompose the water to release hydrogen which forms an explosive mixture with oxygen. In particular, the prior technique for disposal of lithium cells disclosed in U.S. Pat. No. 4,637,928 can result in the release of toxic gases formed during reactions to neutralize the battery components. The technique disclosed therein incorporates a hammermill into which lithium batteries are fed in their "as received" form, i.e. not discharged, dismantled or disassembled.

The hammermill is located in an explosion proof room specifically designed to retain the toxic off gases which occur during the battery destruction process. The hammers impacting on the sealed batteries cause an explosive release of energy. The water used to immerse the exposed components causes the lithium to react explosively and hydrogen gas to be released which also could explosively combine with reactants. The thionyl chloride and hydrogen can also react to form a toxic mist of hydrochloric and sulfuric acid and thionyl chloride which fills the room housing the hammermill.

The present invention is primarily designed for the disposal of batteries with cells composed of a lithium metal anode and a liquid thionyl chloride electrolyte. However, it is also applicable to other battery compositions based on lithium, such as lithium/sulfur dioxide, lithium/sulfuryl chloride, lithium/iodine, lithium/iron disulfide, lithium/polymer, lithium/magnesium dioxide or lithium/carbon monofluoride batteries, or batteries utilizing other hazardous anode, cathode and electrolyte combinations such as nickel/metal hydride or sodium/sulfur sodium/nickel batteries.

Accordingly, there is a need for a process which will allow the safe and controlled dismantling and destruction of used lithium cells which avoids the release of toxic materials, reduces the chance of explosion and fire during disposal and places the materials generated in the destruction process in a suitable form for disposal or recycling.

SUMMARY

The present invention allows the safe disposal of electrical batteries, particularly lithium/thionyl chloride cells. The process includes the steps of discharging the cell, substantially reducing the temperature of the cell to a temperature sufficient to significantly retard any further chemical reactions and reduce any pressure built up in the battery case, disassembling the battery and cutting the cells into small pieces, feeding the pieces into an incinerator maintained at at least 650° C., separately rinsing the solid and gaseous materials discharged from the incinerator with water solutions, mixing and neutralizing the resultant solutions and removing any precipitates created thereby.

BRIEF DESCRIPTION OF THE DRAWING

These and other features, aspects and advantages of the present invention will become better understood with reference to the following description, appended claims, and accompanying drawing, where:

DETAILED DESCRIPTION OF DRAWING

Figure 1:
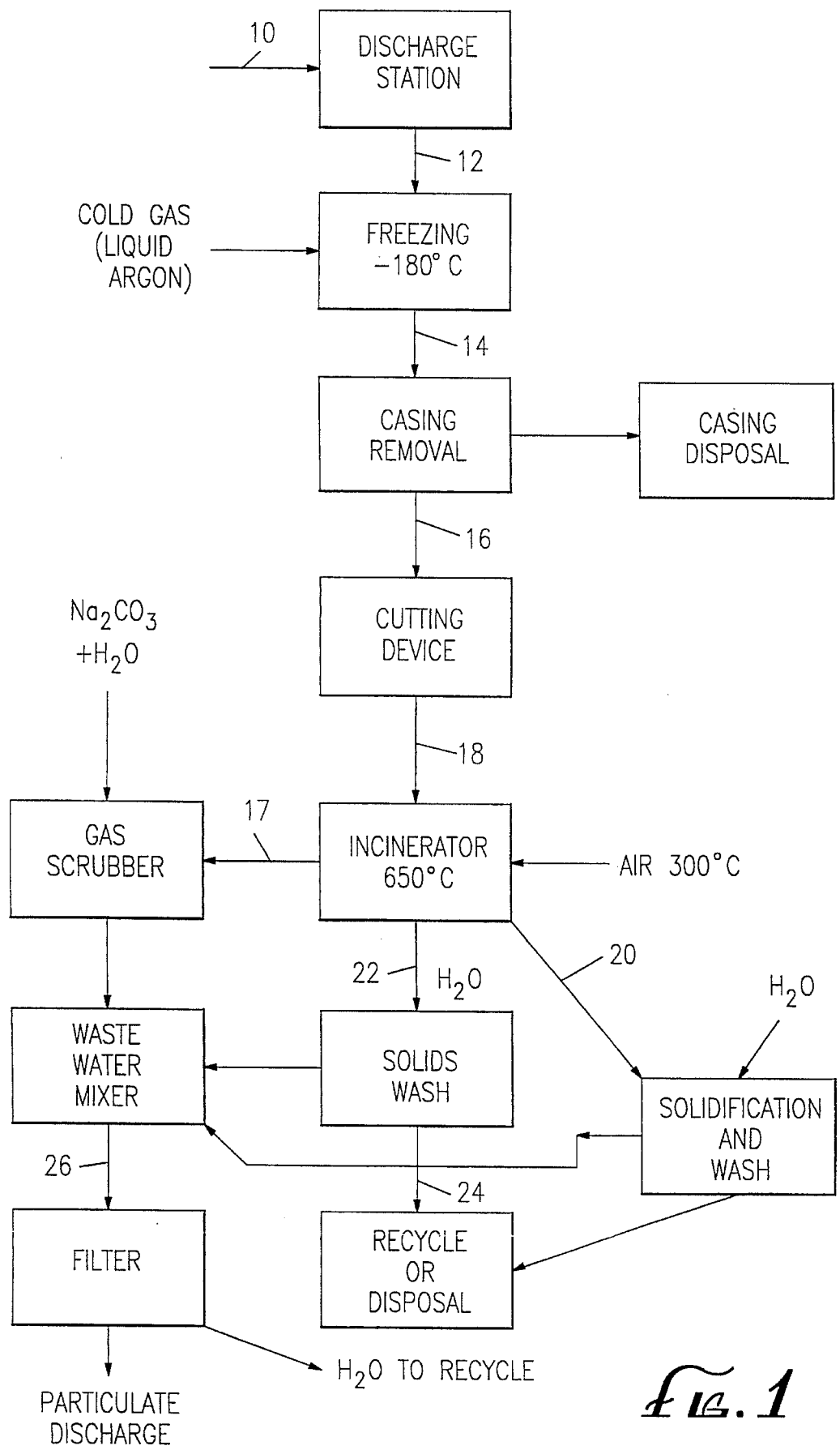
FIG. 1 is a schematic diagram showing the flow of materials through the treatment process.

The primary objective of the invention is to allow the destruction of a battery composed of hazardous materials without creating a hazard and to produce less hazardous and less toxic waste products which can be safely recycled for other applications. Of particular concern is the disposal of lithium electric cells, particularly lithium/thionyl chloride cells.

In a preferred embodiment of the process of the present invention, a lithium battery 10 is substantially discharged, with the following electrochemical reactions taking place:

Anodic reaction: 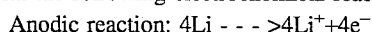

Cathodic reaction: 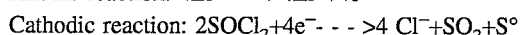

Sum of anodic and cathodic reactions: 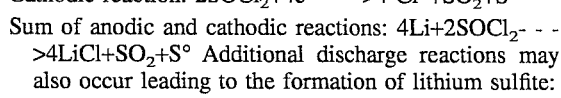 Additional discharge reactions may also occur leading to the formation of lithium sulfite:

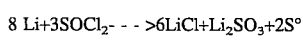

In the lithium batteries where, according to the sum of the reactions, stoichiometric amounts of lithium metal and thionyl chloride exist, the discharge reactions will consume at least 99% of the reactive components, thus eliminating the major portion of the danger associated with the further manipulations. All batteries are not made with stoichiometric amounts of lithium and cathode material. Therefore, in batteries containing excess lithium the reactions can be more energetic.

However, initial discharging will substantially reduce the amount of unreacted lithium and thus reduce these hazards. In particular, metallic lithium when exposed to water generates an explosive hydrogen/oxygen mixture and thionyl chloride reacts with water to generate sulfuric and hydrochloric acid. Discharge is usually performed over a 48 hour period but more rapid discharge can be used to speed up the process.

Further, more rapid discharge causes the battery temperature and internal pressure to increase. Therefore, it may be desirable to also cool the battery during discharge as long as it is not cooled to a temperature which retards discharge or creates a tendency, demonstrated by lithium cells, to explode on rewarming from below −20° C.

As a next step in the process, the discharged battery 12 is frozen in a low temperature, relatively inert liquified gas such as liquid nitrogen (−195°) or liquid argon (−180° C). The low temperature reduces the reactivity of the remaining battery components and the internal pressure in the battery shell.

The battery cell or multiple cells may be encased in a shell, usually aluminum. The freezing enables removal of the casing, elimination of the electrical connections on the frozen battery 14 and processing of the cells through a cutting device, where the cell is sliced into pieces 18, all at a significantly reduced risk of explosion or exposure to toxic materials.

The sliced cell pieces 18 are then fed into an incinerator, which is maintained at about 650° C. Air, preheated to about 300° C., is fed into the incinerator to assure the efficiency of the incinerator processing.

Any lithium remaining unreacted in the cell is then oxidized to lithium oxide which leaves the incinerator along with the solid waste:

$$2 Li + 0.50\ O_2 \longrightarrow Li_2O$$

Any remaining thionyl chloride is reacted with water to yield hydrochloric acid and sulfur dioxide which reacts further with water to form sulfuric acid:

The carbon paste and plastic separators of the battery are converted to carbon dioxide ($CO_2$) and water vapor ($H_2O$).

All metals and salts which are in a liquid state at the incinerator temperature are discharged from the reactor as a molten stream 20 which can be solidified for recycle or disposal.

Any scrap metal, such as aluminum, steel and nickel, which is not melted at the incinerator temperature, is discharged from the incinerator as solid pieces 22. These pieces 22 are cooled and washed with water. The washed solid materials 24 can then be recycled for reuse or solely discarded.

The water used for cooling and washing is collected for later use. The gases leaving the incinerator 17 are collected in a scrubbing system and, using an alkaline scrub solution such as a sodium carbonate solution, an alkaline discharge stream is formed. The alkaline discharge stream, when mixed with the scrap metal cooling and washing water, undergoes the following reactions:

$$Li_2O + H_2O \longrightarrow 2LiOH$$
$$LiOH + HCl \longrightarrow LiCl + H_2O$$
$$SO_2 + H_2O \longrightarrow H_2SO_3$$
$$2LiOH + H_2SO_3 \longrightarrow Li_2SO_3 + 2H_2O$$
$$2LiOH + Na_2CO_3 \longrightarrow Li_2CO_3 + 2NaOH$$
$$Na_2CO_3 + 2HCl \longrightarrow 2NaCl + CO_2 + H_2O$$
$$Na_2CO_3 + H_2SO_3 \longrightarrow Na_2SO_3 + CO_2 + H_2O$$
$$CaO + 2HCl \longrightarrow CaCl_2 + H_2O$$
$$CaO + H_2SO_3 \longrightarrow CaSO_3 + H_2O$$

In addition, all dissolved toxic heavy metal ions, such as cadmium, nickel and chromium, are hydrolyzed and precipitated according to the formula:

$$M^{2+} + 2OH^- \longrightarrow M(OH)_2$$

where $M^{2+}$ is a bivalent heavy metal ion and $OH^-$ is a hydroxyl ion.

As can be seen, all potentially hazardous materials are either neutralized or converted to an inert precipitate. The insoluble particulate matter 26 can be removed from the discharge of the mixer/precipitator by filtration. The pH of the resultant water, which contains some dissolved salts, is adjusted to 7.0 and recycled back to the scrubbing system or released to drainage.

While a separate wash solution is described for the liquid, solid and gaseous stream, it is contemplated that one wash solution can be used for more then one discharge stream from the incinerator or the wash stream could mix serially with more then one incinerator stream. For example, the alkaline wash stream could be used to wash the liquid discharge stream from the incinerator.

The recovered metals and precipitated metal hydroxides can be separated for reuse or can be blended with other materials for various different applications such as fillers for construction materials.

Although the present invention has been described in detail with reference to a preferred version and uses thereof, other versions and uses are possible. For example, the procedure is not limited to lithium/thionyl chloride or other lithium based batteries but is also usable for disposal of other types of batteries or compositions which may create hazards or toxic materials on disposal such as the dismantling of certain explosive or propellant devices. Additionally, the method of disposal is useful with any substance that has explosive properties or a hazardous reaction when exposed to air, water, or water vapor. Therefore, the appended claims should not be limited to the description of the preferred versions contained herein.

What is claimed is:

1. A process for the safe disposal of electrical storage batteries having at least one cell comprising the steps of:
    a) electrically discharging a battery,
    b) lowering the temperature of the battery to about −180° C., and
    c) cutting the cells into pieces and
    d) disposing of the pieces.

2. The process of claim 1 wherein the step of disposing of the pieces constitutes feeding the pieces into an incinerator maintained at at least 650° C.

3. The process of claim 2 further including the step of collecting and separating gaseous, molten and solid material discharged from the incinerator.

4. The process of claim 3 further including the step of solidifying the molten material, washing the solidified molten material and the solid material, cooling the solid materials and removing any water soluble chemicals solidified therewith to form a solid discharge and a solids wash solution.

5. The process of claim 4, further including the step of reacting the gases exiting the incinerator with an alkaline scrubbing solution to form an alkaline discharge stream.

6. The process of claim 5 further including the step of mixing the alkaline discharge stream with the solids wash stream to generate insoluble precipitates and a liquid carrier.

7. The process of claim 6 further including the step of removing the insoluble precipitates from the liquid carrier and bringing the liquid carrier to a pH of 7.0.

8. The process of claim 1 wherein the electric batteries contain lithium/thionyl chloride cells.

9. The process of claim 1 wherein the electric batteries are emersed in a non-reactive liquid to lower the temperature of the batteries to −180° C.

10. The process of claim 1 wherein the liquid is selected from the group consisting of liquid argon and nitrogen.

11. A process for the safe disposal of electrical storage batteries having at least one cell comprising the steps of:
    a) electrically discharging a battery,
    b) lowering the temperature of the battery to about −180° C.,
    c) cutting the cells into pieces,
    d) feeding the pieces into an incinerator maintained at at least 650° C., the incinerator having gaseous, liquid and solid discharge streams, and e) treating the discharge streams with water to cool the discharge streams and dissolve any water soluble constituents.

12. The process of claim 11 wherein the water which is added to the gaseous discharge streams includes a dissolved alkaline chemical.

13. The process of claim 11 or 12 wherein the water after mixing with each discharge stream is combined to form a single liquid waste stream.

14. A process for the disposal of a device having various constituents which can create a hazardous reaction upon destruction comprising the steps of:

a) lowering the temperature of the device to substantially reduce the rate of chemical reaction of constituents thereof and reduce any internal pressure in excess of atmospheric pressure, b) converting the devices to several pieces, smaller in size than the device, c) delivering the pieces to an incinerator operating at a temperature sufficient to convert each of the constituents to a more chemically stable form, said conversion creating solid, liquid and gaseous incineration products, and d) cooling the incineration products by exposing them to multiple sources of water, the water also acting to dissolve any water soluble components in the incineration products and to react with any constituents of the incinerator products which are water reactable.

15. The process of claim 14 further including the step of mixing the water delivered from multiple sources after exposure to the incinerator products.

16. The process of claim 14 wherein the device is a lithium battery.

17. The process of claim 14 wherein the device is an explosive device.

18. The process of claim 14 wherein gaseous incineration products are exposed to an alkaline water solution to form an alkaline wash stream, the alkaline wash stream being mixed with the water stream following exposure of the water streams to non-gaseous incinerator products.

* * * * *